United States Patent
Gaysinskiy

(10) Patent No.: US 7,361,901 B1
(45) Date of Patent: Apr. 22, 2008

(54) SCINTILLATOR DETECTOR FABRICATION

(75) Inventor: Valeriy Gaysinskiy, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 120 days.

(21) Appl. No.: 11/445,752

(22) Filed: Jun. 2, 2006

(51) Int. Cl.
*G01T 1/20* (2006.01)

(52) U.S. Cl. .............................. 250/361 R; 250/363.01

(58) Field of Classification Search ............. 250/361 R
See application file for complete search history.

(56) References Cited

U.S. PATENT DOCUMENTS

| | | | |
|---|---|---|---|
| 5,171,996 A | 12/1992 | Perez-Mendez | |
| 5,892,230 A * | 4/1999 | Goodberlet et al. | .... 250/361 R |
| 6,469,305 B2 | 10/2002 | Takabayashi et al. | |
| 6,921,909 B2 | 7/2005 | Nagarkar | |

OTHER PUBLICATIONS

Nagarkar et al., "CCD-Based High Resolution Digital Radiography System for Non Destructive Evaluation," *IEEE Trans. Nucl. Sci.* 44:885-889 (1997).

Nagarkar et al., "Structured CsI(T1) Scintillators for X-Ray Imaging Applications," *IEEE Trans. Nucl. Sci.* 45:492-496 (1998).

Nagarkar et al., "New Design of a Structured CsI (T1) Screen for Digital Mammography," *SPIE, Physics of Medical Imaging* 5030:541-546 (2003).

Shestakova et al., "A New Sensor for Thermal Neutro Imaging," *IEEE Trans. Nucl. Sci.* 52:1109-1113 (2005).

* cited by examiner

*Primary Examiner*—Kimberly D. Nguyen
*Assistant Examiner*—Kiho Kim
(74) *Attorney, Agent, or Firm*—Townsend and Townsend and Crew LLP

(57) ABSTRACT

The present invention provides methods for selectively forming a scintillator layer on a substrate as well as related devices. The method includes positioning an electrostatic dissipative organic resin layer on a first portion of a substrate surface, and depositing scintillator material on both the resin layer and a second portion of the substrate surface. The method further includes removing the resin layer from the substrate as to remove from the substrate scintillator material deposited on the resin layer while leaving scintillator material on the second portion of the substrate.

20 Claims, 2 Drawing Sheets

A

B

C

D

E

SCINTILLATOR DETECTOR FABRICATION

BACKGROUND OF THE INVENTION

The present invention relates generally to radiation detectors and methods. More specifically, the present invention relates to methods of selectively forming a scintillator layer on a substrate and related devices and assemblies.

Scintillation spectrometers are widely used in detection and spectroscopy of energetic photons (e.g., X-rays and γ-rays). Such detectors are commonly used, for example, in nuclear and particle physics research, medical imaging, diffraction, non destructive testing, nuclear treaty verification and safeguards, nuclear non-proliferation monitoring, and geological exploration.

A wide variety of scintillators are now available and new scintillator compositions are being developed. Among currently available scintillators, thallium-doped alkali halide scintillators have proven useful and practical in a variety of applications. One example includes thallium doped cesium iodide (CsI(Tl)), which is a highly desired material for a wide variety of medical and industrial applications due to its excellent detection properties, low cost, and easy availability. Having a high conversion efficiency, a rapid initial decay, an emission in the visible range, and cubic structure that allows fabrication into micro-columnar films (see, e.g., U.S. Pat. No. 5,171,996), CsI(Tl) has found use in radiological imaging applications. Furthermore, its high density, high atomic number, and transparency to its own light make CsI(Tl) a material of choice for x-ray and gamma ray spectroscopy, homeland security applications, and nuclear medicine applications such as intra-operative surgical probes and Single Photon Emission Computed Tomography or SPECT.

Scintillation spectrometry generally comprises a multi-step scheme. Specifically, scintillators work by converting energetic photons such as X-rays, gamma-rays, and the like, into a more easily detectable signal (e.g., visible light). Thus, incident energetic photons are stopped by the scintillator material of the device and, as a result, the scintillator produces light photons mostly in the visible light range that can be detected, e.g., by a suitably placed photodetector. Various possible scintillator detector configurations are known. In general, scintillator based detectors typically include a scintillator material optically coupled to a photodetector. In many instances, scintillator material is incorporated into a radiation detection device by first depositing the scintillator material on a suitable substrate. A suitable substrate can include a photodetector or a portion thereof, or a separate scintillator panel is fabricated by depositing scintillator on a passive substrate, which is then incorporated into a detection device.

Unfortunately, during the scintillator deposition process scintillator material can often coat areas of the photodetector or substrate other than the areas in which scintillator material deposition is specifically desired including, for example, sensitive, delicate, and/or expensive components of the photodetector or scintillator detector assembly. For example, a known manufacturing problem is that of scintillator such as CsI being deposited on the electrodes of the scintillation light detectors (photodetectors) when the scintillator layer is being formed. Common evaporation deposition processes deposit scintillator material on all exposed surfaces, including photodetector electrodes, and cleaning or pulling the scintillator material off from unwanted areas can damage the usefully deposited scintillator material and/or the electrodes that are being cleared. Thus, significant damage to the scintillator layer and/or electrical components of the photodetector substrate may be sustained in the process of removing the scintillator material from the components.

Thus, there is a need for improved techniques and methods for depositing scintillator materials on a substrate in the fabrication of scintillation detectors. In particular, methods and assemblies are needed for selectively forming a scintillator layer on a substrate, such as a photodetector, in a controlled and accurate manner, and by avoiding the damage often inflicted by current removal methods.

BRIEF SUMMARY OF THE INVENTION

The present invention provides methods for selectively forming a layer of scintillator material on a substrate, and related scintillator based radiation detection devices. The methods include positioning on a substrate surface an organic resin masking layer and depositing scintillator material on masked and unmasked portions of the substrate. Following deposition of scintillator material, removal of the resin layer from the substrate surface allows removal of scintillator material deposited on the resin while leaving scintillator material on the unmasked portion of the substrate. The positioning of the resin layer and use of a resin masking layer particularly well-suited for commonly used scintillator deposition methods allows careful, and controlled deposition of scintillator material targeted to a desired portion of a substrate surface, while avoiding unnecessary and/or unwanted damage to useful portions of the scintillator material, the substrate (e.g., photodetector), and/or components thereof.

Thus, in one aspect of the present invention, a method for selectively forming a scintillator layer on a substrate is provided. The method includes positioning an electrostatic dissipative organic resin layer on a first portion of a substrate surface, and depositing scintillator material on both the resin layer and a second portion of the substrate surface. The method further includes removing the resin layer from the substrate as to remove from the substrate scintillator material deposited on the resin layer while leaving scintillator material on the second portion of the substrate.

In another aspect, the present invention provides a method for selectively forming a scintillator layer on a substrate including positioning a polyimide resin layer on a first portion of a substrate surface. The method further includes depositing scintillator material on both the polyimide layer and a second portion of the substrate surface, and removing the polyimide layer from the substrate so as to remove from the substrate scintillator material deposited on the polyimide layer while leaving scintillator material on the second portion of the substrate.

In yet another aspect, the present invention provides a radiation detection device. The device includes a substrate having a masking layer removably positioned on a first portion of a surface of the substrate, the masking layer comprising an electrostatic dissipative organic resin. The device further includes a scintillator material deposited on the masking layer and a second portion of the substrate surface, wherein removal of the masking layer from the substrate removes from the substrate scintillator material deposited on the masking layer while leaving scintillator material on the second portion of the substrate.

For a fuller understanding of the nature and advantages of the present invention, reference should be made to the ensuing detailed description and accompanying drawings.

Other aspects, objects and advantages of the invention will be apparent from the drawings and detailed description that follows.

DETAILED DESCRIPTION OF THE INVENTION

Figure 1:
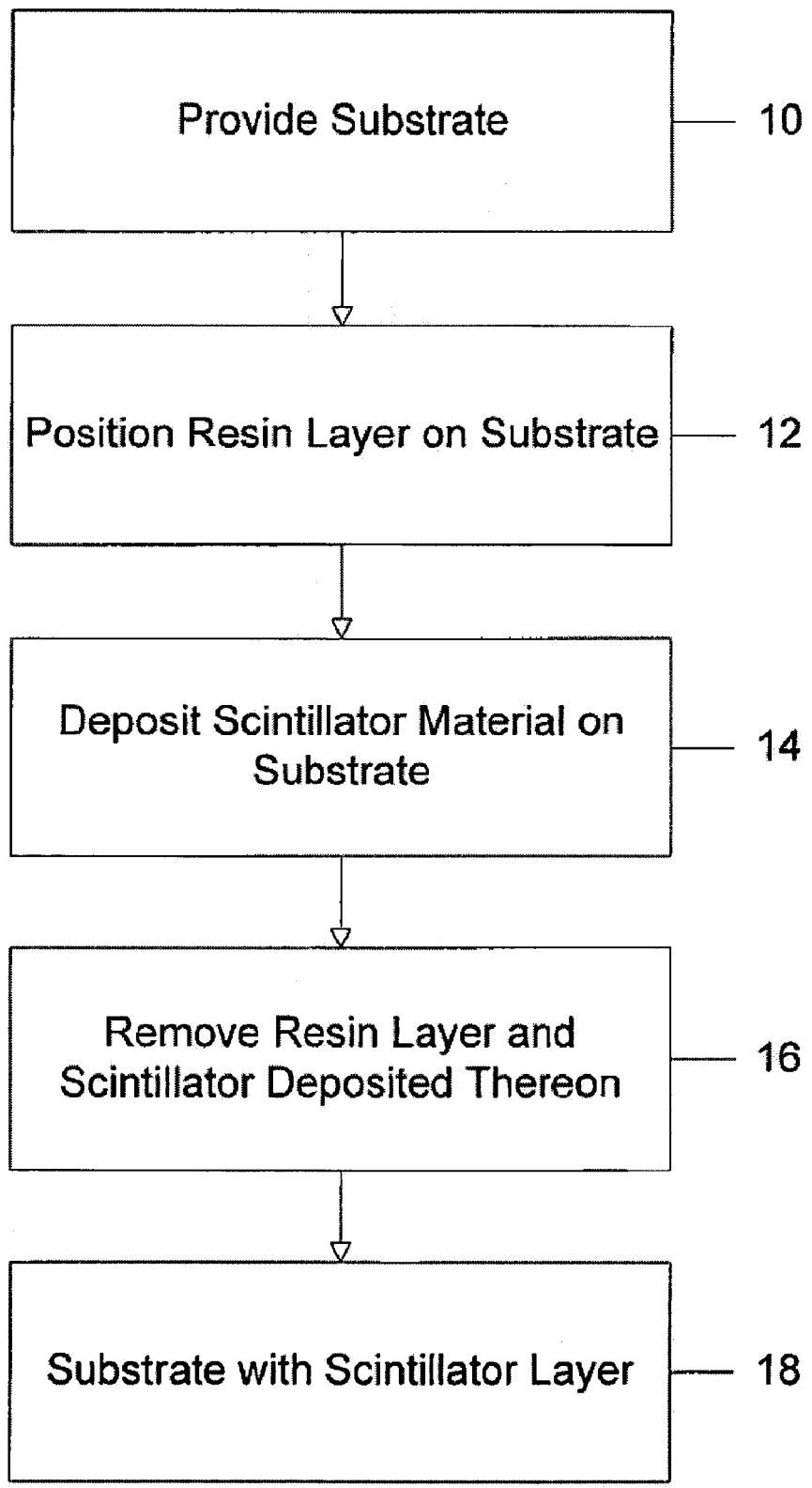
FIG. 1 is a flow chart illustrating a method of selectively forming a scintillator layer on a substrate according to an embodiment of the present invention.

Referring to FIG. 1, a method of selectively forming a scintillator layer on a substrate according to an embodiment of the invention is described. As indicated in block 10, a substrate onto which deposition of scintillator material is desired is provided. Next, a resin layer is positioned on the substrate, as indicated in block 12. The resin layer is positioned on the substrate as to substantially mask or cover a first portion of the substrate surface, while leaving at least a second portion of the substrate surface exposed or not masked/covered by the resin layer. The second portion includes at least the portion of the substrate surface onto which scintillator material deposition is desired. Next, scintillator material is deposited on the substrate, as indicated in block 14. During the deposition process, the scintillator material will typically coat or at least partially cover both the resin layer and the second portion of the substrate surface not having the resin layer mask. Following deposition of the scintillator material, the method includes removing the resin layer and thereby removing from the substrate scintillator material deposited on the resin layer, as indicated in block 16. As will be understood, removal of the resin layer and scintillator layer deposited thereon allows formation of a substrate with a scintillator selectively formed on the second portion of the substrate surface, as indicated in block 18.

As will be recognized, various substrates are suitable for use in a scintillator radiation detector according to the invention. Non-limiting examples include compositions such as amorphous carbon, or includes glassy carbon, graphite, aluminum, sapphire, beryllium, or boron nitrate. Additional examples can include a fiber optic plate, prism, lens, or photodetector. The substrate can be a detector device or portion or surface thereof (e.g., optical assembly, photodetector, etc.). The substrate can comprise a portion of an assembled detector device or assembly and/or comprise a detector portion (e.g., scintillator panel) that can be adapted to or incorporated into a detection device or assembly.

Generally, a resin layer according to the present invention provide a protective or masking layer as to allow selective deposition on the substrate surfaces not covered by the resin layer. Suitable resin layer is of a composition such that the resin material will remain stable or maintain structural integrety during the scintillator deposition process, which can often include high temperature environments (e.g., up to about 500° F.). Thus, the resin layer material will maintain solid structural integrity or have a high melting point, e.g., greater than about 300° F., or in some cases greater than about 500° F. Furthermore, a resin layer is preferably electrically conductive or electrostatically dissipative, since substrate surfaces onto which scintillator deposition is desired often include electrical components and/or are sensitive to electrostatic discharge.

Various resin materials are known in the art and can be used for selective deposition of a scintillator layer according to the methods of the present invention. A resin layer can include any form suitable for positioning on a substrate surface according to the present invention and can include films, tapes, sheets, and the like. The resin layer typically includes an organic resin, such as an organic polymer resin. In one embodiment, a resin layer includes a polyimide film including polyimde polymer compositions known by the trade name "Kapton®" polyimide films (E. I. du Pont de Nemours and Company). Such polyimide films are typically mildly electrically conductive (e.g., electrostatically dissipative) and, therefore, offer electrostatic protection to the substrate surface and electrical components deposited thereon. In addition, such polyimide films can remain stable in a wide range of temperatures including, e.g., temperatures up to and exceeding 600° F. As such, these materials are well suited, for example, to the high temperatures at which scintillator materials such as CsI are deposited (e.g., up to about 500° F.).

Other organic polymer resins will be suitable for use as a resin masking layer for scintillator deposition, according to the methods of the present invention. Exemplary resin layer materials can include polyesters (e.g., Mylar™ static dissipative adhesive-baked film), since such materials are mildly electrically conductive/electrostatically dissipative. Such polyesters, however, maintain structural integrety up to about 180° F. and, therefore, are appropriately selected for use with certain scintillator materials and/or scintillator deposition methods.

A resin layer will typically include a means for maintaining the resin layer in the desired position on the substrate surface. Typically, a resin layer includes an adhesive, such as a silicon adhesive, that does not leave a residue following removal and is therefore suitable for clean room use (e.g., non-residue adhesive) as well as for use at high temperatures (e.g., up to about 500° F.). Such adhesives are typically "weak" adhesives, such that the force between the resin layer with adhesive and components of the substrate (e.g., electrodes, etc.) is less than the force between the substrate components and the substrate, and removal of the resin with adhesive does not pull off or dislodge the components or electrodes from the substrate. Other methods of maintaining the resin layer positioning (e.g., clampling, etc.) will be suitable for use according to the present invention.

A variety of different scintillators may be used in forming a scintillator layer for a radiation detector of the present invention. In a particular embodiment of the present invention, the radiation detector includes a scintillator layer having a CsI(Tl) scintillator, such as a microcolumnar CsI(Tl) scintillator (Nagarkar et al., *IEEE Trans. Nucl. Sci.* 44:492 (1998); Nagarkar et al., *IEEE Trans. Nucl. Sci.* 44:885 (1997)). Furthermore, a microcolumnar layer may be pixellated, for example, so as to further improve spatial resolution. Thus, in one embodiment, the scintillator layer includes a pixellated micro-columnar film scintillator. A scintillator layer can include, for example, a pixellated micro-columnar CsI(Tl) scintillator. For further discussion of pixellated microcolumnar film scintillators see, for example, Nagarkar et al., *SPIE, Physics of Medical Imaging*, Vol. 4, No. 21, pp 541-546, (2003); and Shestakova et al., *IEEE Trans. Nucl. Sci.*, Vol. 52, No. 4., Aug. (2005). See also, commonly owned U.S. Pat. No. 6,921,909, which is incorporated herein by reference.

Scintillator materials forming a scintillator layer of the present invention typically include a "dopant" that can effect certain properties, such as physical properties (e.g., brittleness, and the like) as well as scintillation properties (e.g., luminescence, light yield, resolution, and the like), of the scintillator materials. For example, in embodiments where the scintillator layer include a CsI(Tl) film (e.g., vapor deposited film), thallium dopant concentration can be an important parameter to control, for example, in order to ensure suitable deposition of the scintillator material. Control of dopant concentration in vapor deposited films can be accomplished by co-evaporating the dopant with the scintillator material. For example, thallium iodide can be co-evaporated with CsI. For high light yield in CsI(T1) films, a higher dopant (Tl) concentration (e.g., about 0.5 to about 0.7% by molar weight) can be used. For high resolution, a moderate dopant (Tl) concentration can be incorporated in the scintillator layer (e.g., about 0.2 to about 0.3% by molar weight). Resulting films can be annealed, for example, to ensure response uniformity over the scintillator layer.

It will be recognized that the methods of the present invention can include any suitable means for depositing a layer of scintillator material on a substrate surface. In addition to those already mentioned, additional techniques for depositing scintillator compositions can include, for example, flash evaporation techniques, including where properly doped material is dropped into a hot boat and instantly evaporated and, therefore, the composition of the scintillator film remains the same as the source. Scintillator compositions can also be deposited by pulse laser evaporation in order to form the scintillator layer.

The thickness of the scintillator layer will depend, in part, on the desired use of the radiation detector. For example, the scintillator layer will have a thickness of about 10 µm to about 10 mm. In one embodiment, a microcolumnar CsI(Tl) scintillator layer will have a thickness of about 3 mm to about 10 mm (e.g., "thick" scintillator). In other embodiments, the scintillator layer is a "thin" scintillator, having a thickness of about 10 µm to about 0.5 mm. As can be appreciated, the terms "thick" and "thin" are relative terms, and the thickness of a "thick" CsI(Tl) scintillator layer will merely be thicker than a given or desired spatial resolution. Because the columnar structure of the CsI(Tl) scintillator layer, the columns channel light mostly along the columns, so that the resolution is determined principally by column diameter, instead of or in addition to the thickness of the layer, and the thickness can therefore be higher without detrimentally affecting the resolution.

Scintillators used in the inventive radiation detectors may be suitable for use in a variety of radiation detection applications including, e.g., high-speed imaging applications. In high-speed imaging applications, for example, a premium is placed on the X-ray to light conversion efficiency, the speed of emission or decay time, and the X-ray stopping power of the scintillator. CsI(Tl) has high light conversion efficiency, a fast decay time, good X-ray stopping properties, and is easily fabricated.

Figure 2:
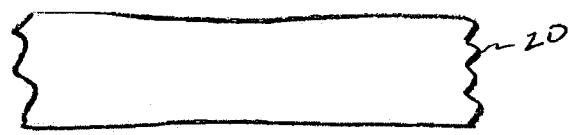
FIGS. 2A through 2E illustrate deposition and selective removal of scintillator material on a substrate surface according to an embodiment of the invention.
Figure 2:
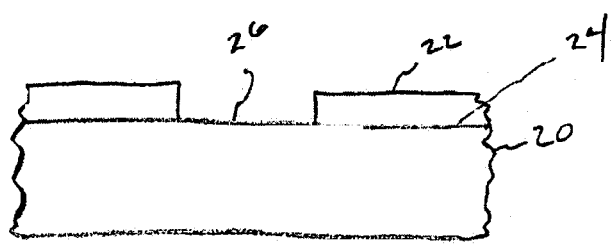
Figure 2:
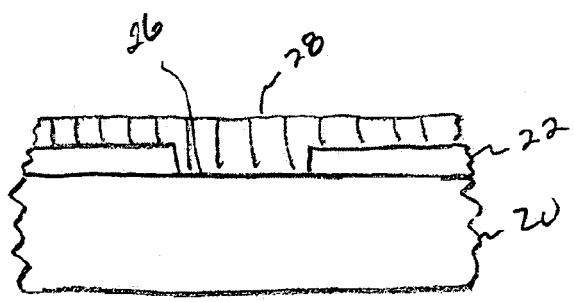
Figure 2:
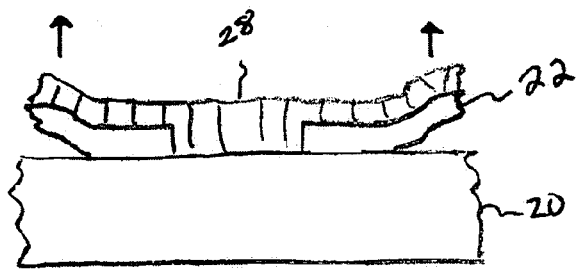
Figure 2:
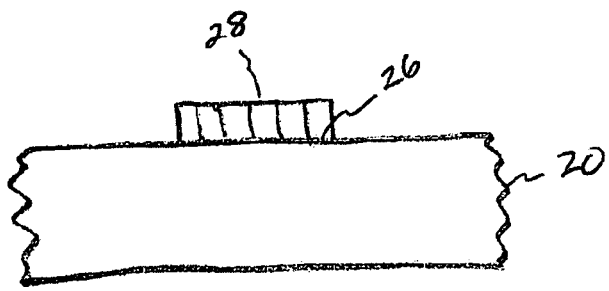

Selective formation of a scintillator layer on a substrate is further described with reference to FIG. 2A through FIG. 2B. A substrate 20 is provided for scintillator deposition according to the present invention (FIG. 2A). A resin layer 22 is then positioned on the substrate 20 (FIG. 2B). The resin layer 22 is typically positioned on a surface of the substrate such that the resin layer 22 substantially covers or masks a first portion 24 of the substrate surface while leaving a second portion 26 of the substrate surface uncovered or exposed. Following positioning of the resin layer 22, scintillator material 28 can be deposited on the substrate 20 (FIG. 2C). The scintillator material 28 can be deposited on both resin layer 22 and the portion 26 of the substrate surface not covered/masked by the resin layer 22. After deposition of the scintillator material 28, the resin layer 22 is removed from the substrate 20 so as to remove both the resin layer 22 and scintillator material 28 deposited thereon, but while leaving scintillator material 28 deposited on a portion 26 of the substrate 20 (FIG. 2D). The resin layer 22 can be removed in any suitable manner including, for example, lifting, pulling, peeling, etc. the resin layer away from the substrate 20. Once the resin layer 22 and scintillator material 28 deposited thereon are removed from the substrate 20, a scintillator layer 28 is left on the first portion 26 of the substrate 20 (FIG. 2E).

The radiation detector can additionally have one or more coatings formed on a surface of the scintillator coating. The coating can be formed only on a surface of the scintillator layer not in contact with the substrate, but may be formed on additional surfaces of the radiation detector. The additional coating can include, e.g., a polymer protective layer, a moisture protective barrier, and/or an optically absorptive or reflective layer.

It is understood that the examples and embodiments described herein are for illustrative purposes only and that various modifications or changes in light thereof will be suggested to persons skilled in the art and are to be included within the spirit and purview of this application and the scope of the appended claims. Numerous different combinations are possible, and such combinations are considered to be part of the present invention.

What is claimed is:

1. A method for selectively forming a scintillator layer on a substrate, comprising:
   positioning an electrostatic dissipative organic resin layer on a first portion of a substrate surface;
   depositing scintillator material on both the resin layer and a second portion of the substrate surface;
   removing the resin layer from the substrate as to remove from the substrate scintillator material deposited on the resin layer while leaving scintillator material on the second portion of the substrate.

2. The method of claim 1, wherein the resin layer comprises a melting temperature greater than about 300 degrees F.

3. The method of claim 1, wherein the resin layer comprises a melting temperature greater than about 500 degrees F.

4. The method of claim 1, wherein the resin layer comprises a polyimide polymer.

5. The method of claim 1, wherein positioning the resin layer comprises binding the resin layer to the substrate surface with a weak adhesive.

6. The method of claim 1, wherein the substrate comprises a photodetector.

7. The method of claim 1, wherein the scintillator material comprises CsI(Tl).

8. A method for selectively forming a scintillator layer on a substrate, comprising:
   positioning a polyimide resin layer on a first portion of a substrate surface;
   depositing scintillator material on both the polyimide layer and a second portion of the substrate surface;
   removing the polyimide layer from the substrate as to remove from the substrate scintillator material deposited on the polyimide layer while leaving scintillator material on the second portion of the substrate.

9. The method of claim 8, wherein the resin layer comprises a melting temperature greater than about 300 degrees F.

10. The method of claim 8, wherein the resin layer comprises a melting temperature greater than about 500 degrees F.

11. The method of claim 8, wherein positioning the resin layer comprises binding the resin layer to the substrate surface with a weak adhesive.

12. The method of claim 8, wherein the substrate comprises a photodetector.

13. The method of claim 8, wherein the scintillator material comprises CsI(Tl).

14. A radiation detection device, comprising:
a substrate having a masking layer removably positioned on a first portion of a surface of the substrate, the masking layer comprising an electrostatic dissipative organic resin; and
a scintillator material deposited on the masking layer and a second portion of the substrate surface, wherein removal of the masking layer from the substrate removes from the substrate scintillator material deposited on the masking layer while leaving scintillator material on the second portion of the substrate.

15. The device of claim 14, wherein the resin layer comprises a melting temperature greater than about 300 degrees F.

16. The device of claim 14, wherein the resin layer comprises a melting temperature greater than about 500 degrees F.

17. The device of claim 14, wherein the resin layer comprises a polyimide polymer.

18. The device of claim 14, wherein positioning the resin layer comprises binding the resin layer to the substrate surface with a weak adhesive.

19. The device of claim 14, wherein the substrate comprises a photodetector.

20. The device of claim 14, wherein the scintillator material comprises CsI(Tl).

* * * * *